Aug. 9, 1938.  O. L. WOOD  2,126,596

LIQUID PURIFICATION APPARATUS

Filed Dec. 2, 1936

Inventor:
Orla L. Wood,
by Harry E. Dunham
His Attorney.

Patented Aug. 9, 1938

2,126,596

UNITED STATES PATENT OFFICE 2,126,596

LIQUID PURIFICATION APPARATUS

Orla L. Wood, Schenectady, N. Y., assignor to General Electric Company, a corporation of New York Application December 2, 1936, Serial No. 113,875

2 Claims. (Cl. 266—1)

The present invention relates to liquid purification apparatus, and more particularly to an improved means for separating dirt and gaseous impurities from a liquid of high specific gravity such as a liquid metal.

In passing a liquid metal and, particularly, mercury through a closed system which involves successive vaporizing and condensing operations there is a tendency for the mercury to become contaminated with various impurities. For example, in the operation of a mercury turbine equipment the mercury coming from the condensers is found to contain substantial quantities of solid and gaseous materials. The particles of solid material frequently become wetted with the mercury in such a way that gravity separation is prevented while the gases are so thoroughly absorbed that their separation by ordinary means is impracticable.

It is an object of the present invention to provide an improved dirt separator embodying means for facilitating the removal of solid and gaseous impurities from a body of mercury. According to a preferred embodiment of the invention this is accomplished by providing impact surfaces and flow surfaces arranged to expedite the separation of such impurities from the mercury and additional means for eliminating separated gases and solids from the mercury circulating system.

Figure 2:
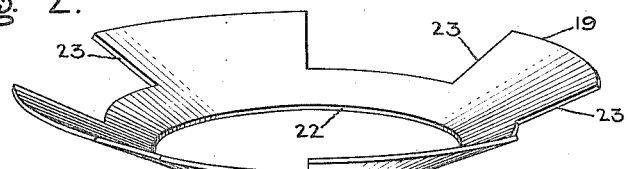
Figure 3:
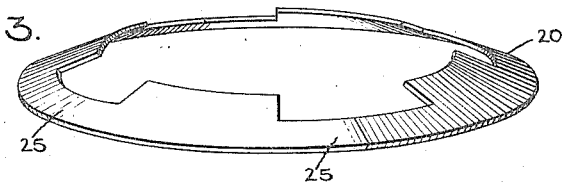

The features of novelty which I desire to protect herein are set forth with particularity in the appended claims. My invention itself, however, together with further objects and advantages thereof will best be understood by reference to the following description taken in connection with the drawing, in which Fig. 1 represents a sectional view of a separator suitably embodying the invention, and Figs. 2 and 3 are perspective views illustrating in greater detail certain of the elements of the separator.

Figure 1:
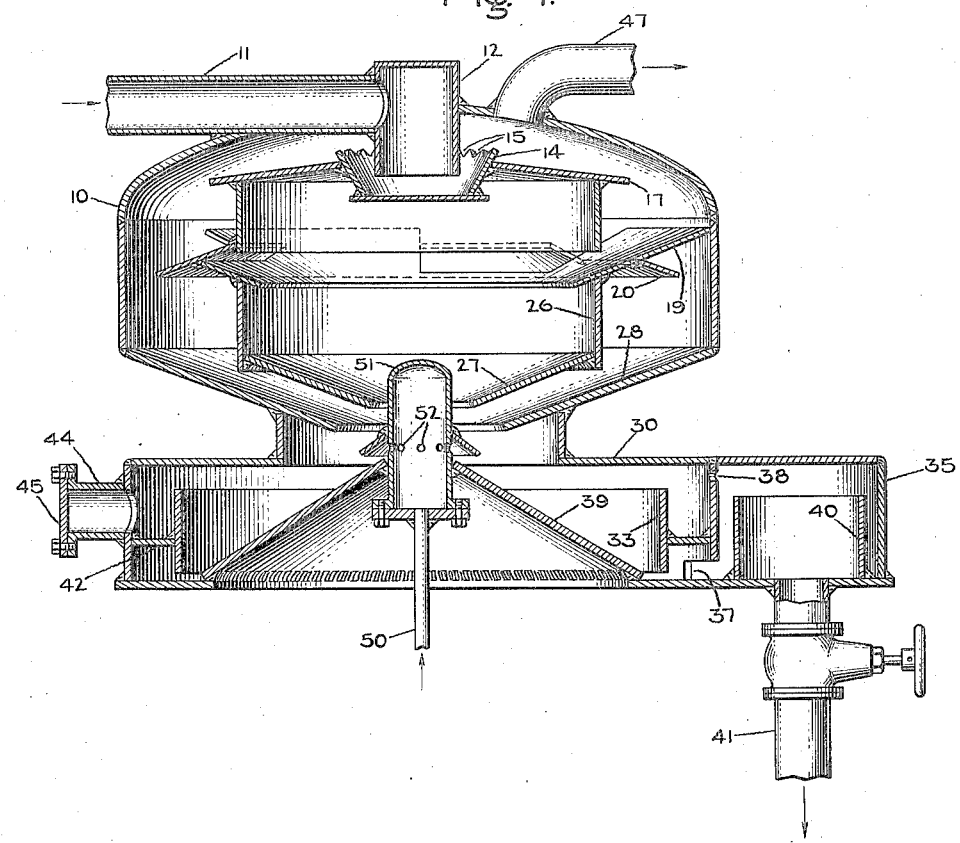

Referring particularly to Fig. 1 there is shown an external casing 10 provided with an inlet comprising a conduit 11. This latter element may typically be connected to the outlet of the condenser of a mercury turbine system, and when so connected will furnish a passage for the flow of liquid mercury at temperatures of the order of from 400 to 500 degrees F. Under these conditions the inflowing mercury will contain metallic particles and particles of mercury oxide and other oxides collected during the passage through the boiler and turbine apparatus. Such particles are frequently coated or wetted with mercury in such a way that their density is practically that of pure mercury, and their separation by the direct action of gravity is rendered impracticable. To overcome this difficulty my invention provides means for subjecting the mercury to a series of successive impacts under conditions which favor the freeing of suspended dirt particles.

In the particular embodiment illustrated mercury flowing through the conduit 11 is led into a downwardly directed inlet pipe 12 through which it may pass into a receiving cup 14. The upper edge of this cup is considerably above the lower end of the inlet pipe 12, so that the mercury collected in the cup effectively seals the separator casing from direct communication with the condenser to which the conduit 11 is connected. Surplus mercury is caused to overflow the cup 14 by passing through serrations 15 formed in its upper lip. In this way uniform distribution of radial flow is assured and the moving mercury is caused to pass evenly over a first flow surface comprising an inclined plate 17. From the plate it is led to a series of sequentially arranged impact and flow surfaces serving a purpose to be more fully described in the following:

The first of the impact surfaces is provided by the combination of members 19 and 20 arranged below the casing inlet and the plate 17 and adapted to receive mercury droplets flowing by gravity from the latter element. The member 19 is illustrated most clearly in Fig. 2, and comprises a hollow downwardly convergent annular shell having a central opening 22 and a plurality of spaced peripheral gaps or openings 23. The member 20, which is shown separately in Fig. 3, comprises outwardly inclined surface portions 25 adapted to be arranged below and in correspondence with the openings 23 of the shell 19. In the particular embodiment illustrated, these members are supported by a depending cylinder 26 in such a way that the inwardly directed flow surfaces of the shell 19 are unobstructed.

As a result of the shape and positioning of the members 19 and 20, mercury flowing from the plate 17 is divided into inwardly and outwardly flowing components which form relatively thin films streaming over the upper surfaces of the members. The inwardly flowing portion of the mercury is caused to fall upon a combined impact and flow surface 27 while the outwardly flowing mercury falls on a similar but separate surface 28. From these surfaces the mercury is led into an underlying gravity sump whose nature and operation will be explained more fully hereinafter.

As a result of the impact sustained by the mercury in falling from one impact surface to another, the droplets of mercury which surround the various dirt particles are shaken free and the dirt is permitted to rise to the mercury surface. Once this separation is accomplished there is little or no tendency for a recombination to occur under the conditions of temperature and pressure which exist in the separator. In addition to the impact effect described in the foregoing, the fact that the mercury is caused to traverse extended flow surfaces over which it passes at a relatively low velocity, greatly facilitates the separation by gravity of both solid and gaseous impurities. The gaseous impurities along with a portion of the solid impurities are removed from the separator casing by means to be more fully described hereinafter. The remaining portion of the solid impurities is segregated and removed from the mercury circulating system by means of a gravity sump comprising a casing 30 mechanically connected to the separator casing and, in effect, forming a part of it.

Mercury falling from the lower edges of the surfaces 27 and 28 is received in an enclosure formed by a cylindrical shell 33 slightly spaced from the bottom of the casing 30. The chamber which surrounds this shell is in communication with a second chamber 35 through openings 37 and 38 of which the former permits the transmission of liquid while the latter serves to equalize pressure between the two chambers. The quantity of mercury which these chambers can accommodate is substantially diminished by the presence of a conical shell 39 projecting upwardly from the floor of the casing 30.

The mercury level within the chambers is determined by an overflow dam 40 which surrounds the opening of an escape duct 41 which may, for example, lead back to the boiler of the mercury turbine system. The upper lip of this dam is slightly below the upper lip of the cylindrical shell 33, so that the normal mercury level within the two casings is maintained close to but below the top of the shell. Consequently, separated dirt which is floated to the top of the mercury by virtue of its lesser specific gravity is caused progressively to overflow the shell 33 while the mercury itself is prevented from such overflow. By this expedient the dirt is segregated in a trap comprising the annular recess bounded by the shell 33, the side wall of the casing 30, and a floor plate 42. Dirt accumulating in this trap may be removed from time to time as occasion demands through an outlet provided by a pipe 44 and a removable cover plate 45.

In order to eliminate gases such as nitrogen and oxygen which may have been separated from the mercury by the impact and flow processes described above, there is provided a gas outlet 47 leading to a suitable exhaust or vacuum system. Inasmuch as the separator is completely sealed from the condenser by the mercury seal provided in the cup 14, the casing 10 may be maintained under at least a partial vacuum whereby effective degassing of the mercury can be accomplished.

It also has been observed that the impact separation described above projects large quantities of dust-like particles of solid impurities into the free space above the liquid mercury. These suspended particles may be drawn off through the outlet 47 by the sweeping action of the mercury vapor formed by the "flashing" or partial vaporization which occurs as the mercury enters the evacuated casing.

If it is necessary to provide for the reduction of the mercury oxides or for the prevention of mercury oxidation in the separator, a continuous supply of reducing agent may be circulated through the separator and exhausted through the outlet 47. I have shown for this purpose a suitable inlet arrangement comprising a pipe 50 and a header 51 provided with a series of shielded openings 52. It is contemplated that a continuous stream of hydrogen may be introduced through the pipe 50 during the periods of operation of the separator whereby the flowing mercury may be maintained at all times in contact with a reducing atmosphere.

While I have shown particular embodiments of my invention, it will be understood by those skilled in the art that many modifications may be made without departing from the invention, and I aim by the appended claims to cover all such modifications as fall within the true spirit and scope of the invention.

What I claim as new and desire to secure by Letters Patent of the United States is:

1. Apparatus for separating dirt particles from mercury condensate including the combination of an enclosing casing, an inlet adjacent to the top of the casing for admitting hot condensate thereto, means providing a liquid seal for said inlet to permit the maintenance of at least a partial vacuum in the casing, an outlet adjacent to the top of the casing for removing from the casing mercury vapor and solid particles suspended in such vapor, means providing extended flow surfaces for liquid mercury within the casing, and means at the bottom of the casing for segregating solid impurities separated from the liquid mercury during its passage over such surfaces.

2. A liquid purification apparatus including an enclosing casing having an inlet at the upper portion thereof, and means providing extended flow surfaces for liquid proceeding from said inlet, said means comprising an annular member having its upper surface inwardly inclined toward the axis of the casing, said member being provided with a central opening and with spaced gaps in its inwardly inclined surface, another member having portions interfitting with the gaps in the said annular member and providing outwardly inclined surfaces, means for directing portions of the liquid from the inlet to both said inwardly inclined and outwardly inclined surfaces, and a plurality of extended surfaces arranged to receive separately the inwardly and outwardly directed components of liquid.

ORLA L. WOOD.